US008577960B2

(12) United States Patent
Boller et al.

(10) Patent No.: US 8,577,960 B2
(45) Date of Patent: Nov. 5, 2013

(54) PROVIDING STATUS INFORMATION FOR COMPONENTS IN A DISTRIBUTED LANDSCAPE

(75) Inventors: Stefan Boller, Heidelberg (DE); Tihomir Stoyanov, Pleven (BG)

(73) Assignee: SAP AG, Walldorf (DE)

( * ) Notice: Subject to any disclaimer, the term of this patent is extended or adjusted under 35 U.S.C. 154(b) by 424 days.

(21) Appl. No.: 12/846,617

(22) Filed: Jul. 29, 2010

(65) Prior Publication Data

US 2012/0030275 A1     Feb. 2, 2012

(51) Int. Cl.
    *G06F 15/173*     (2006.01)
(52) U.S. Cl.
    USPC ........................................... 709/203
(58) Field of Classification Search
    None
    See application file for complete search history.

(56) References Cited

U.S. PATENT DOCUMENTS

| 7,610,357 B1* | 10/2009 | Chandrachood | 709/219 |
| 2006/0064476 A1* | 3/2006 | Decasper et al. | 709/223 |

OTHER PUBLICATIONS

Agera, Suneet. "Java Adminsitrator with SAP Netweaver Administrator 7.1". Feb. 5, 2009.*

SAP Netweaver, "Your Foundation for Enabling and Managing Change," [online], <http://www.sap.com/platform/netweaver/index.epx>, retrieved Jul. 29, 2010, 2 pages.
SAP Landscape Administration with SAP NetWeaver Administrator, [online], <http://help.sap.com/saphelp_rc10/helpdata/en/7e/c82c42be6fde2ce10000000a1550b0/content.htm> retrieved Jul. 29, 2010, 1 page.
System Landscape Selection, SAP Library—System Landscape Administration with SAP NetWeaver Administrator, [online], <http://help.sap.com/saphelp_rc10/helpdata/en/41/5157428b0cd242e10000000a1550b0/content.htm>, retrieved Jul. 29, 2010, 1 page.
SAP Library—System Landscape Administration with SAP NetWeaver Administrator, Table of Contents, [online], <http://help.sap.com/saphelp_rc10/helpdata/en/84/c82c42be6fde2ce10000000a1550b0/tree.htm>, retrieved Jul. 29, 2010, 3 pages.

* cited by examiner

*Primary Examiner* — Scott Christensen
(74) *Attorney, Agent, or Firm* — Fish & Richardson P.C.

(57) ABSTRACT

In a distributed landscape, different levels of data caches, such as a memory cache and prefetch tables, are provided for storing status and other information about a remote system to a client. Status information may be provided to the client from a memory cache if available and up to date. The memory cache may be updated using information stored in the one or more prefetch tables or by reading the data from the remote system(s). The prefetch tables may be updated by reading information from the remote systems. The data caches are dynamically updated to store the most up-to-date status information available. The data stored in each data cache level may be updated at predetermined intervals or upon a request by the client. Status messages for the one or more remote systems selected are displayed, providing the client with a status overview of the distributed landscape.

30 Claims, 4 Drawing Sheets

PROVIDING STATUS INFORMATION FOR COMPONENTS IN A DISTRIBUTED LANDSCAPE

TECHNICAL FIELD

This disclosure relates to providing status information of components in a distributed landscape and, more particularly, to providing status information using a memory cache in conjunction with one or more prefetch tables.

BACKGROUND

Distributed systems may include one or more components in a distributed landscape. Status messages of one or more of the components may provide the client with an overview of the distributed landscape. The landscape may be administered by a central landscape administrator located on a server. For example, the NetWeaver Administrator ("NWA") by SAP AG allows various components of the distributed system to be monitored remotely. Further, the NWA may collect data from various components to manage the distributed system and communicate information to clients or other front end systems.

SUMMARY

The following disclosure is directed to methods, systems, and articles for providing a status message to a client for a component in a distributed landscape. In certain embodiments, a method for providing status information may include providing a memory cache, the memory cache configured to store status information for the component in the distributed landscape. In certain instances of the embodiments, the memory cache may be stored on a server in communication (e.g., across a network), or may be local to the client. The method may also include providing one or more prefetch tables, the one or more prefetch tables configured to store status information for the component in the distributed landscape. In certain instances, the prefetch tables may be located in a repository on a server, may be distributed across multiple servers, or may be local to the client. The prefetch tables can be accessible to store and provide status information associated with one or more components in the distributed system. The method may also include providing access to the component of the landscape to read status information from the component in the distributed landscape. The status information may be read from the components in the case where the memory cache and the prefetch tables do not have updated status information available to provide to the client. In such circumstances, and in others, the components can provide the status information to the memory cache, the prefetch tables, or to the client through the server. The method may also include displaying the status message for the component to the client, the status message based on status information.

In certain embodiments, a system for providing to a client status updates of one or more components of a distributed landscape may include a memory cache, the memory cache configured to store status information for the component in the distributed landscape. The system may also include one or more prefetch tables, the one or more prefetch tables stored on a repository, and configured to store status information for the component in the distributed landscape. The memory cache and the prefetch tables may be local to the client and in communication with the server across a network. In certain instances, the memory cache and the prefetch tables may be located remote from the client, but in communication thereto across the network. This disclosure further contemplates different configuration options, chosen by a user, client, or administrator or other party to optimize the distributed system in providing the status information to the client. The system has a server in communication with the client and the one or more components of the distributed landscape, the one or more components of the distributed landscape accessible by the server to read status information from the one or more components in the distributed landscape, the server operable to store status information in the memory cache and the one or more prefetch tables and to provide status information to the client. In certain instances, the server is operable to run a central landscape administrator to oversee the operation and architecture of the distributed landscape. The central landscape administrator may be called when any of the status update routines are called. For example, the central landscape administrator may be called in the event of an automatic update of the memory cache and/or the prefetch tables, or the administrator may be called in response to a request received from the client to provide status updates for the one or more distributed components of the system. The client may include a client device operable by the client to provide status updates upon request at predetermined times, such as start-up, refresh, or periodically.

In certain instances of the embodiments, the memory cache may be updated with status information received from the component in the distributed landscape. In certain instances of the embodiments, the status information stored in the memory cache is different from the status information stored in the one or more prefetch tables. For example, the status information stored on the memory cache may have an age that is older than the age of information stored on the prefetch tables.

In certain instances of the embodiments, the status information stored in the memory cache has a different age than the status information stored in the one or more prefetch tables.

In certain instances of the embodiments, displaying the status message to the client includes generating the status message based on status information received from the memory cache if the status information for the component is available in the memory cache and the status information stored in the memory cache satisfies a predetermined age threshold.

In certain instances of the embodiments, displaying the status message to the client further comprises generating the status message based on information received from the one or more prefetch tables if the status information for the component is unavailable from the memory cache.

In certain instances of the embodiments, the status information is deemed unavailable when the status information exceeds a predetermined age.

In certain instances of the embodiments, displaying the status message to the client further includes generating the status message based on information received from the component if the status information in unavailable from the prefetch tables.

In certain instances of the embodiments, the status information is deemed unavailable when the status information exceeds a predetermined age.

In certain instances of the embodiments, the information received from the component may be stored in a memory cache.

In certain instances of the embodiments, the prefetch tables are updated with information received from the component.

In certain instances of the embodiments, status information is read from one or more prefetch tables, and the status information read from the prefetch tables is stored in a memory cache.

In certain instances of the embodiments, status information is read from a remote component, and the status information read from the remote component is stored into a memory cache.

In certain instances of the embodiments, the status information read from the remote component is stored in one or more prefetch tables associated with the remote component.

In certain instances of the embodiments, the memory cache stores first status information for at least one remote component, and the prefetch tables store second status information for the at least one remote component.

In certain instances of the embodiments, the first status information and the second status information have the same properties.

In certain instances of the embodiments, the first status information has a first time-out value, and the second status information has a second time-out value.

In certain instances of the embodiments, the first time-out value is less than the second time-out value.

In certain instances of the embodiments, the memory cache is automatically updated based on status information stored in one or more prefetch tables, the prefetch tables corresponding to one or more remote devices associated with the client.

In certain instances of the embodiments, the component is a first component, the memory cache further configured to store status information for a second component in the distributed network, the prefetch tables further configured to store status information for a second component; and the second component accessible to provide status information associated with the second component.

In certain instances of the embodiments, the status information associated with the first component is updated independent of the status information associated with the second component.

In certain instances of the embodiments, a request from the client to receive status information for the component in a distributed landscape is received. In certain instances of the embodiments, the component is a first component. A first request from the client to receive status information of the first component may be received and a second request from the client to receive status information of a second component may also be received. The first request may be processed independent of the second request. The first request and the second request may be received from the same client or from different clients. In addition, the first request and the second request may be received from the same client contemporaneously.

In certain instances of the embodiments, metadata associated with status information displayed to the client is stored upon execution of a status update process for the component. The metadata is processed and statistical data associated with the update process is established for the component.

In certain instances of the embodiments, the statistical data includes errors associated with the update process, and the method further comprises alerting the client to errors found by the statistical data.

In certain instances of the embodiments, the statistical data may be used to enhance the efficiency of the update process.

In certain instances of the embodiments, the status information from the one or more prefetch tables may be read. The status information may be streamed to the client and displayed.

In certain instances of the embodiments, the server is operable to provide status information to the client based on receiving a request for status information.

In certain instances of the embodiments, the server is operable to store status information in the memory cache and the one or more prefetch tables based on predetermined configuration information.

In certain instances of the embodiments, the memory cache is located local to the client.

In certain instances of the embodiments, at least one of the one or more prefetch tables is located local to the client.

While generally described as computer implemented software that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

This disclosure relates to systems, methods, and articles directed to providing status message updates for remote devices to clients in a distributed landscape. In a system landscape, which may consist of one or more distributed components, it may be desirable to provide a status overview of the whole landscape or any part thereof. The status of one or more components of the distributed landscape may be provided to the client running a central landscape administrator. This status overview may be displayed quickly such that the client would not have to wait too long for the status information. Furthermore, the information should be as current as possible. As such, the data associated with the status should contain the age of the information, if applicable, and the client should have the ability to get the current status if the data presently available is too old. The status information should also be available immediately after initial setup and system restart. To solve this task, a multi-stage approach is used.

Several periodic operations (e.g., prefetch jobs) are used to get landscape information from a central landscape directory (to be able to determine dynamically the available components and their connection parameters), as well as the different sets of status information from the remote, distributed components. These jobs may be independent from each other (hence, they can run in parallel), as well as independent from the rest of the mechanism. The data fetched by these jobs is stored into a data base table (such as a prefetch table) together with the current time (this information is later used to determine the age of the entries).

Prefetch tables may be updated by performing prefetch operations, the recurrence of which may be configurable and the execution of which may be independent from a client request. Each entry in the prefetch tables may be updated in this manner. A client request may trigger an update of the prefetch tables, for example, when a client wants to see the data or another software component wants to read it and the data has not yet been fetched or is too old. The system may first determine whether the data is available in memory cache. If yes, the information is returned immediately and is available for display or further processing. If not, the system reads the data from the prefetch table and puts it into the memory such that it is also quickly available for further requests. If the data is not yet in the prefetch table (since the prefetch jobs have not yet run), the system reads the data directly from the remote components and stores it again into the memory and the prefetch table. The latter can be omitted to avoid concurrent writes to the database.

In each case, the consumer of the data gets a result, whose age depends on the time when the corresponding prefetch job was executed. If the consumer is not satisfied with the age of the data, it can trigger another request for the current data, which is then directly forwarded to the respective components (in the case, for example, where the data is not yet in the prefetch table) and memory and the prefetch table is updated (in some instances). This updated information is then also available for all other consumers.

Each read to the memory checks the age of the data against a configurable maximum age. If the data is older than the maximum age, the data in the prefetch table is checked. If this data is also too old, the system can dynamically determine whether to provide the inaccurate data to the client or to provide the information directly from the remote components. The determination may be based on weighing the data inaccuracy against costs to system performance.

Figure 1:
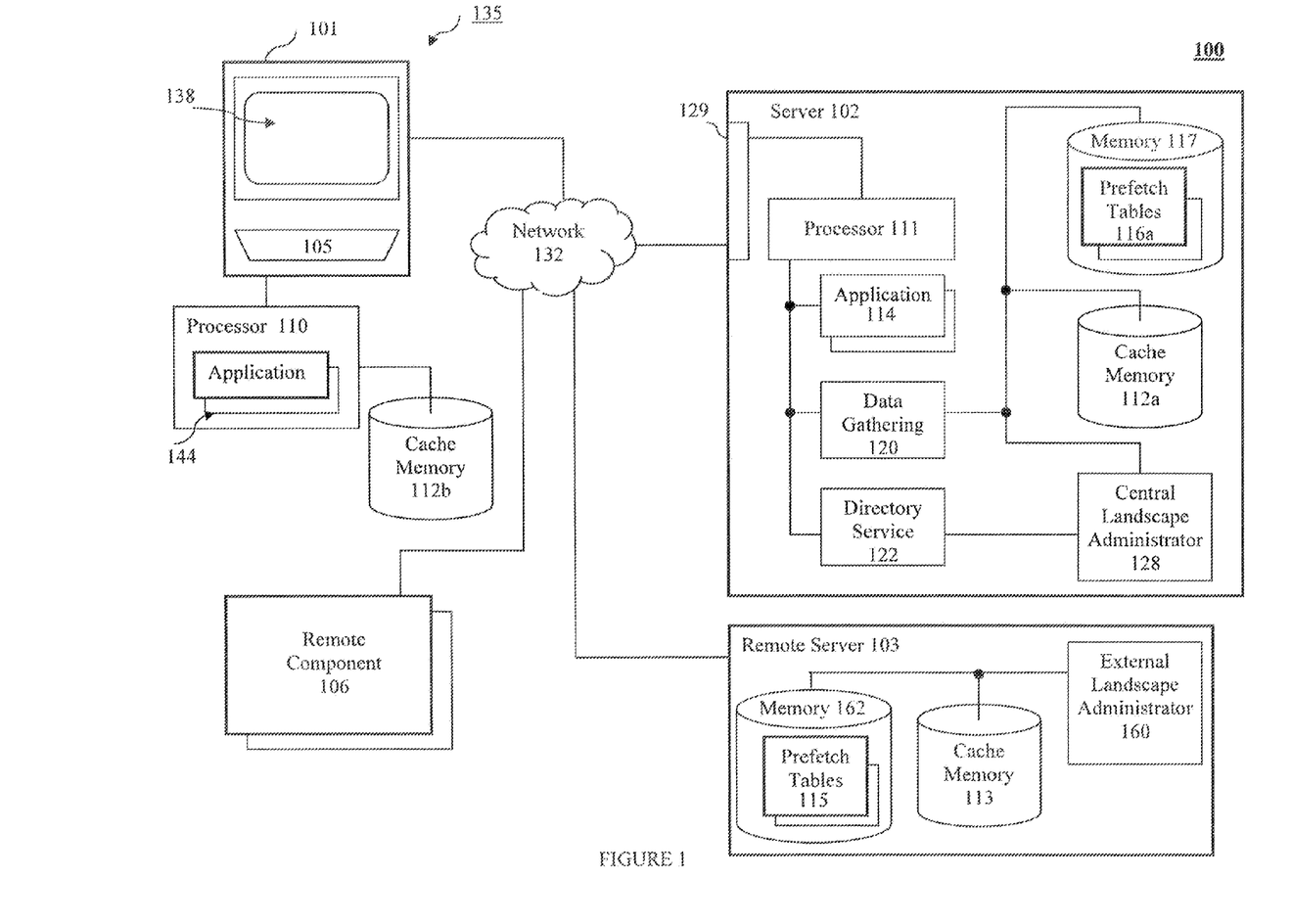
FIG. 1 is a diagram illustrating a distributed landscape in accordance with embodiments of the present disclosure.

Turning to the example implementation of FIG. 1, the illustrated environment 100 includes, or is communicably coupled with, server 102 and one or more clients 135, at least some of which communicate across network 132. Client 135 may include a client device 101, as well as other elements, as described in more detail below. Environment 100 may be a distributed environment where server 102 is communicably coupled to one or more distributed systems. In the example shown in FIG. 1, distributed systems may include one or more remote components 106. The client 135 may be associated to the one or more remote components 106, and may communicate to the one or more remote components 106 (i.e., devices, systems, etc.) directly across the network 132 or through the server 102, which is connected to the remote components 106 and the client device 101 across the network 132. In general, environment 100 depicts an example configuration of a system capable of providing status information of the one or more remote components 106 of the distributed systems to client 135 (e.g., displayed on client device 101). Environment 100 is also capable of receiving requests for status information of the one or more components 106 and retrieving that information from a memory cache 112a or 112b, one or more prefetch tables 116a (e.g., stored on memory 117), or directly from the remote component 106. In certain implementations, environment 100 may also be in communication with a remote server 103, which may be communicably coupled to the environment 100 via network 132. Remote server 103 may also be in direct communication with server 102. Remote server 103 may be called to provide information to environment 100 from an external landscape separate from the distributed environment shown in FIG. 1.

In general, the server 102 is any server that stores one or more hosted applications 114, where at least a portion of the hosted applications 114 are executed via requests and responses sent to clients (such as client 135) within, and communicably coupled to, the illustrated environment 100 of FIG. 1. In some instances, the server 102 may store a plurality of various hosted applications 114, while in other instances, the server 102 may be a dedicated server meant to store and execute only a single hosted application 114. In some instances, the server 102 may comprise a web server, where the hosted applications 114 represent one or more web-based applications accessed and executed via network 132 by the clients 135 of the system to perform the programmed tasks or operations of the hosted application 114. At a high level, the server 102 comprises an electronic computing device operable to receive, transmit, process, store, or manage data and information associated with the environment 100. Specifically, the server 102 illustrated in FIG. 1 is responsible for receiving requests from one or more client applications 144 associated with the client(s) 135 of environment 100 and responding to the received requests by processing said requests in the associated hosted application 114, and sending the appropriate response from the hosted application 114 back to the requesting client application 144. In addition to requests from the external clients 135 illustrated in FIG. 1, requests associated with the hosted applications 114 may also be sent from internal clients, external or third-party customers, other automated applications, as well as any other appropriate entities, individuals, systems, or computers. As used in the present disclosure, the term "computer" is intended to encompass any suitable processing device. For example, FIG. 1 illustrates a single server 102, environment 100 can be implemented using two or more servers, as well as computers other than servers, including a server pool. Indeed, server 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 102 may be adapted to execute any operating system, including Linux, UNIX, Windows, Mac OS, or any other suitable operating system. According to one embodiment, server 102 may also include or be communicably coupled with a mail server.

As illustrated in FIG. 1, server 102 includes a processor 111. Although illustrated as a single processor 111 in FIG. 1, two or more processors may be used according to particular needs, desires, or particular embodiments of environment 100. Each processor 111 may be a central processing unit (CPU), a blade, an application specific integrated circuit (ASIC), a field-programmable gate array (FPGA), or another suitable component. Generally, the processor 111 executes instructions and manipulates data to perform the operations of server 102 and, specifically, the one or more plurality of hosted applications 114. Specifically, the server's processor 111 executes the functionality required to receive and respond to requests from the clients 135 and their respective associated client applications 144, as well as the functionality required to perform the other operations of the hosted application 114. Regardless of the particular implementation, "software" or "articles" may include computer-readable instructions, firmware, wired or programmed hardware, or any combination thereof on a tangible (non-transitory) medium or media operable, when executed, to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate. In the illustrated environment 100, processor 111 executes one or more hosted applications 114 on the server 102.

In the present implementation, and as shown in FIG. 1, the server 102 includes an interface 129. The interface 129 is used by the server 102 for communicating with other systems in a client-server or other distributed environment (including within environment 100) connected to the network 132 (e.g., client 135, as well as other systems communicably coupled to the network 132). Generally, the interface 129 comprises logic encoded in software and/or hardware in a suitable combination and operable to communicate with the network 132. More specifically, the interface 129 may comprise software supporting one or more communication protocols associated with communications such that the network 132 or interface's hardware is operable to communicate physical signals within and outside of the illustrated environment 100.

Server 102 also includes a central landscape administrator ("CLA") 128 (e.g., SAP's Netweaver Administrator) in communication with other elements of server 102. For example CLA 128 may be in communication with data gathering module 120 to administrate a data gathering algorithm in response to instructions from processor 111. Processor 111 may execute instructions based on information received from the client 135 through application 114, or may execute predetermined instructions, such as instructions to automatically update information stored in the prefetch tables 116a or in memory cache 112a. Data gathering module 120 may perform operations to find and retrieve information, such as status information and meta data associated therewith, and return that information to the CLA 128 for further processing. Status information retrieved from the various sources may be provided to the client 135 across network 132. Data gathering module 120 may operate in conjunction with a directory service 122 to focus its searching operations. For example, directory service module 122 may provide data gathering module 120 an indication of where to look for information. In the event that a client is requesting status information from one or more remote components 106, directory service 122 may receive an indication of the requesting client and direct data gathering module 120 to the remote component prefetch tables 116a associated with that client 135.

At a high level, each of the one or more hosted applications 114 is any application, program, module, process, or other software that may execute, change, delete, generate, or otherwise manage information according to the present disclosure, particularly in response to and in connection with one or more requests received from the illustrated clients 135 and their associated client applications 144. In certain cases, only one hosted application 114 may be located at a particular server 102. In others, a plurality of related and/or unrelated hosted applications 114 may be stored at a single server 102, or located across a plurality of other servers 102, as well. In certain cases, environment 100 may implement a composite hosted application 114. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, the hosted applications 114 may represent web-based applications accessed and executed by remote clients 135 or client applications 144 via the network 132 (e.g., through the Internet). Further, while illustrated as internal to server 102, one or more processes associated with a particular hosted application 114 may be stored, referenced, or executed remotely. For example, a portion of a particular hosted application 114 may be a web service associated with the application that is remotely called, while another portion of the hosted application 114 may be an interface object or agent bundled for processing at a remote client 135. Moreover, any or all of the hosted applications 114 may be a child or sub-module of another software module or enterprise application (not illustrated) without departing from the scope of this disclosure. Still further, portions of the hosted application 114 may be executed by a client working directly at server 102, as well as remotely at client 135.

The server 102 also includes memory 117. Memory 117 may include any memory or database module and may take the form of volatile or non-volatile memory including, without limitation, magnetic media, optical media, random access memory (RAM), read-only memory (ROM), removable media, or any other suitable local or remote memory component. Memory 117 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 102 and its one or more hosted applications 114. For example, memory 117 may store one or more prefetch tables 116a. Additionally, memory 117 may include any other appropriate data, such as VPN applications, firmware logs and policies, firewall policies, a security or access log, print or other reporting files, as well as others. In embodiments, memory 117 may include one or more prefetch tables 116a. Prefetch tables 116a may store status information for one or more remote components 106.

Likewise, memory cache 112a may store status information for one or more remote components 106. Memory cache 112a may be accessible by CLA 128 to provide remote component status information to client 135 based on instructions executed by processor 111. Though illustrated as a part of server 102, memory cache may be located local to client device 135 (e.g., memory cache 112b). Memory caches 112a and 112b may be any memory that stores information and is accessible to provide information rapidly upon request.

Environment 100 also includes one or more remote components 106. Remote components 106 may be devices, systems, computers, or other distributed platforms in communication with server 102. In general, remote components 106, server 102, and client 135 make up the distributed landscape 100. A client may want to view or display landscape information and gain an overview of the landscape's status. The remote components 106 are in communication with server 102 to provide various data and metadata to be stored in prefetch tables 116a and memory cache 112a. In certain embodiments, data and metadata from remote components 106 are provided by server 102 to local memory cache 112b. (It is to be understood that prefetch tables 116b shown in FIG. 2 may also be stored locally to device 101, in which case server 102 facilitates communication of remote component data and metadata (including status information) to client device 101 for storage in memory cache 112b or prefetch tables 116b stored in memory 109.)

As mentioned above, environment 100 may also include a remote server 103. Remote server 103 includes an external landscape administrator 160 that may communicate with CLA 128 to facilitate extended search and retrieval capabilities for providing updated status messages of distributed components that may be associated with client 135 but not with server 102 (i.e., other distributed landscapes). Remote server 103 may include an external landscape administrator 160 that oversees searching and other functions, such as retrieving status information from external memory cache 113 and/or external prefetch tables 115. Prefetch tables 115 may be stored on external memory 162.

Generally, the network 132 facilitates wireless or wireline communications between the components of the environment 100 (i.e., between the server 102 and the clients 135), as well as with any other local or remote computer, such as additional clients, servers, or other devices communicably coupled to network 132 (inclusive of elements not illustrated in FIG. 1). The network 132 is illustrated as a single network in FIG. 1, but may be a continuous or discontinuous network without departing from the scope of this disclosure, so long as at least a portion of the network 132 may facilitate communications between senders and recipients. The network 132 may be all or a portion of an enterprise or secured network, while in another instance, at least a portion of the network 132 may represent a connection to the Internet. In some instances, a portion of the network 132 may be a virtual private network (VPN), such as, for example, the connection between the client device 101 and the server 102. Further, all or a portion of the network 132 can comprise either a wireline or wireless link. Example wireless links may include 802.11a/b/g/n, 802.20, WiMax, and/or any other appropriate wireless link. In other words, the network 132 encompasses any internal or external network, networks, sub-network, or combination thereof operable to facilitate communications between various computing components inside and outside the illustrated environment 100. The network 132 may communicate, for example, Internet Protocol (IP) packets, Frame Relay frames, Asynchronous Transfer Mode (ATM) cells, voice, video, data, and other suitable information between network addresses. The network 132 may also include one or more local area networks (LANs), radio access networks (RANs), metropolitan area networks (MANs), wide area networks (WANs), all or a portion of the Internet, and/or any other communication system or systems at one or more locations. The web-based application can be any suitable application, including web- or cloud-based portions of a business application, such as an enterprise resource planning (ERP) system. A large number of access methods exist to support network and network device management within, or directed to, any given network. Access methods include Simple Network Management Protocol (SNMP), Command Line Interfaces (CLIs), custom XML, CMIP, Windows Management Instrumentation (WMI), Transaction Language 1, CORBA, netconf, the Java Management Extensions (JMX), the Java Messaging Service (JMS), SOAP, and XML-RPC.

The illustrated environment of FIG. 1 also includes one or more clients 135. Each client 135 may be any computing device operable to connect to or communicate with at least the server 102 and/or via the network 132 using a wireline or wireless connection. In embodiments, client 135 may include a client device 101, such as a computer (PC, Mac, etc.), a portable device, such as a smart phone, iPhone, Blackberry, PDA, etc., a tablet PC such as an iPad, or other such device. In embodiments, client device 101 may be a touch screen device, such as an iPad or iPhone or other similar device, as illustrated by example client device 101 in FIG. 2. Further, as illustrated by client 135, each client device 101 includes a processor 104, hardware keys 105, a client interface (UI) 138 (such as a graphical client interface), one or more client applications 144, and a memory 112b. In general, each client 135 comprises an electronic computer device 101 operable to receive, transmit, process, and store any appropriate data associated with the environment 100 of FIG. 1. It will be understood that there may be any number of clients 135 associated with, or external to, environment 100. For example, while illustrated environment 100 shows a single client, alternative implementations of environment 100 may include more than one client 135 communicably coupled to the server 102, or any other number suitable to the purposes of the environment 100. Additionally, there may also be one or more additional clients 135 external to the illustrated portion of environment 100 that are capable of interacting with the environment 100 via the network 132. Moreover, while each client 135 is described in terms of being used by a single client, this disclosure contemplates that many clients may use one computer, or that one client may use multiple computers. As used in this disclosure, client device 101 is intended to encompass a personal computer, touch screen terminal, workstation, network computer, kiosk, wireless data port, smart phone, personal data assistant (PDA), one or more processors within these or other devices, or any other suitable processing device. For example, each client 135 may comprise a computer that includes an input device, such as a keypad, touch screen, mouse, or other device that can accept client information, and an output device that conveys information associated with the operation of the server 102 (and hosted application 114) or the client 135 itself, including digital data, visual information, the client application 144, or the GUI 138. Both the input and output device may include fixed or removable storage media such as a magnetic storage media, CD-ROM, or other suitable media to both receive input from and provide output to clients of the clients 135 through the display, namely, the GUI 138. The administrator (e.g., CLA 128) can modify various settings associated with one or more of the other clients 135, the server 102, the hosted application 114, and/or any relevant portion of environment 100. For example, the administrator may be able to modify the relevant timeout values associated with each hosted application 114, as well as any of the set of hosted application settings. The administrator may be a computer communicably coupled to server 102 and may control client's 135 access rights to information and applications on server 102.

FIG. 1 provides one example of a client device 101. Environment 100 may include a client device 101, a network 132, and a server 102. In some instances, neither the network 132 nor the server 102 may be a part of the environment 100, or may be otherwise unnecessary, such as when the client device 101 does not have an available connection to the network 132, as well as when the device's 101 operations are performed locally. The client device 101 and the server 102 can communicate across network 132, where applicable. In general, environment 100 depicts an example configuration of a system capable of visualizing, viewing, selecting, and defining an interval of values for use with a software application, database, or other set of data.

Figure 2:
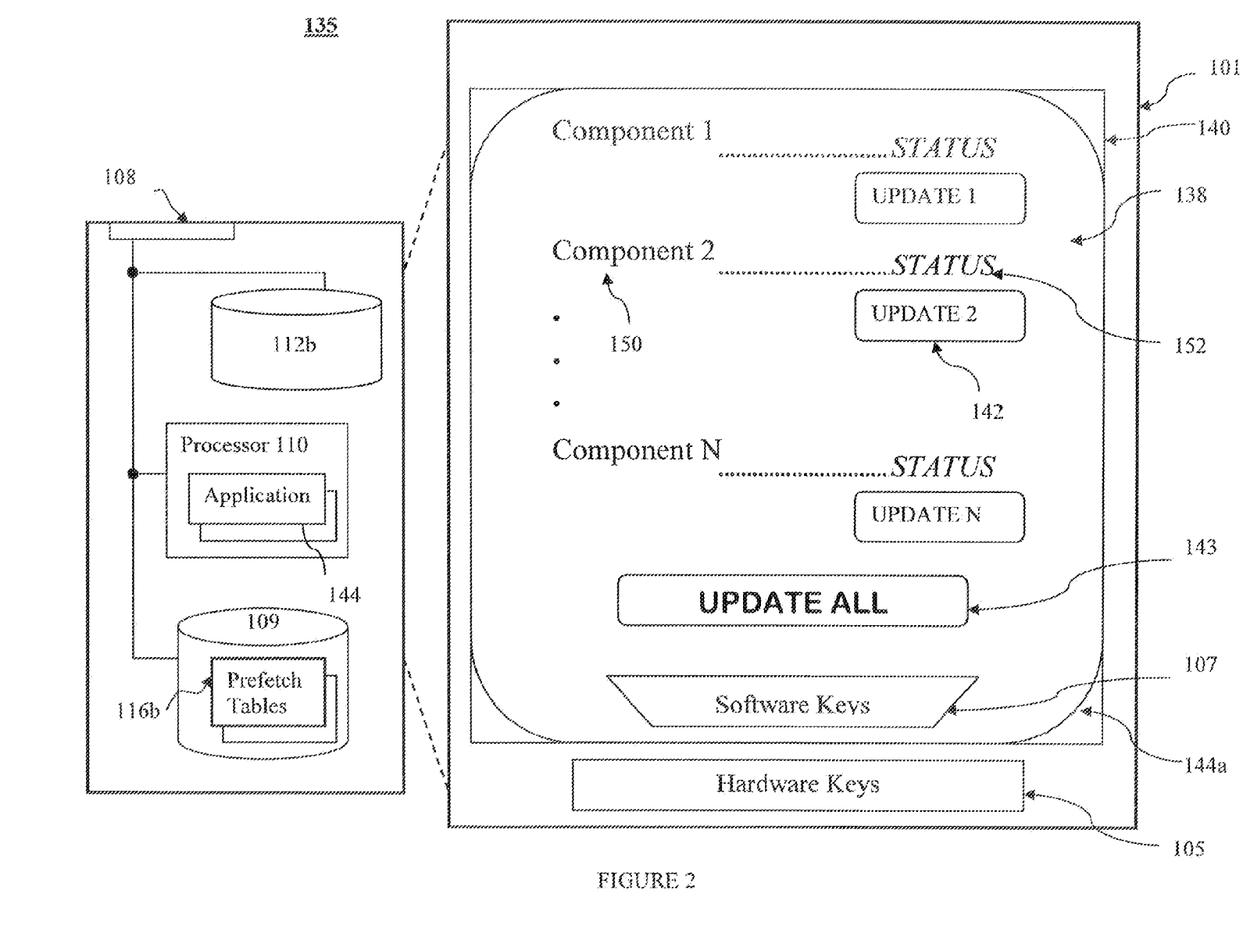
FIG. 2 is a diagram illustrating a graphical client interface of a client device in accordance with embodiments of the present disclosure.

As shown in FIG. 2, client device 101 may include a network interface 108. The interface 108 is used by the client device 101 for communicating with other systems in a client-server or other distributed environment (including within environment 100) connected to the network 132 (e.g., client 135, as well as other systems communicably coupled to the network 132, such as server 102). Generally, the interface 108 comprises logic encoded in software and/or hardware in a suitable combination and operable to communicate with the network 132. More specifically, the interface 108 may comprise software supporting one or more communication protocols associated with communications such that the network 132 or interface's hardware is operable to communicate physical signals within and outside of the illustrated environment 100.

Further, the illustrated client device 101 includes a client interface (UI) that, in embodiments, includes a graphical client interface 138 (GUI) operable to interface with at least a portion of environment 100 for any suitable purpose, including generating a visual representation of the client application 144 (in some instances, the client's web browser) and the interactions with the hosted application 114, including the responses received from the hosted application 114 received in response to the requests sent by the client application 144. In embodiments, host applications 114 may be graphically displayed on client device 101 through a web application or other emulation program. Generally, through the GUI 138, the client is provided with an efficient and client-friendly presentation of data provided by or communicated within the system. The term "graphical client interface," or GUI, may be used in the singular or the plural to describe one or more graphical client interfaces and each of the displays of a particular graphical client interface. Therefore, the GUI 138 can represent any graphical client interface, including but not limited to, a web browser, touch screen, or command line interface (CLI) that processes information in environment 100 and efficiently presents the information results to the client. In general, the GUI 138 may include a plurality of client interface (UI) elements, some or all associated with the client application 144, such as interactive fields, pull-down lists, and buttons operable by the client at client 135. These and other UI elements may be related to or represent the functions of the client application 144, as well as other software applications executing at the client 135. In particular, the GUI 138 may be used to present the client-based perspective of the hosted application 114, and may be used (as a web browser or using the client application 144 as a web browser) to view and navigate the hosted application 114, as well as various web pages located both internal and external to the server, some of which may be associated with the hosted application 114. For purposes of the present location, the GUI 138 may be a part of or the entirety of the client application 144, while also merely a tool for displaying the visual representation of the client and hosted applications' 114 actions and interactions. In some instances, the GUI 138 and the client application 144 may be used interchangeably, particularly when the client application 144 represents a web browser associated with the hosted application 114.

Referring briefly to FIG. 2, client 135 may operate client device 101, which can include any computer or other processing device which executes or displays information associated with one or more applications. Client device 101 may receive and process input from a touch-based (or multi-touch-based) gesture (e.g., from touching buttons such as the update buttons 142 and 143, displayed on screen 140). Additionally, the device 101 is capable of receiving touch input based on multiple finger gestures simultaneously applied onto the screen 140 of the device 101. Different types of devices 101 may be used in accordance with the present disclosure. For example, different size multi-touch devices may be used, as well as touch devices where the touch screen is in a separate housing or structure than the processing portions of the device. In some instances, the screen 140 may be a liquid crystal display (LCD). Further, the screen 140 may recognize touch-based inputs based on electrical conductivity, relative pressure from a touch, using light-sensitive sensors to determine contacts to the screen 140, as well as any other suitable touch input mechanism or combination thereof. In embodiments, device 101 may be a multi-touch device. Examples of multi-touch devices include Apple's iPhone smartphone and iPad tablet device, Google's Nexus One smartphone, HTC's Hero, Legend, and Desire smartphones, Microsoft's Zune HD media device, Palm's Pre smartphone, Motorola's Droid smartphone, as well as numerous other consumer and/or business-related devices and accessories capable of receiving and processing multi-touch inputs.

Client 135 may have access to the distributed environment 100 within a cloud computing network. The servers within the cloud computing network comprise a cloud computing platform for providing cloud-based services. The terms "cloud," "cloud computing," and "cloud-based" may be used interchangeably as appropriate without departing from the scope of this disclosure. Cloud-based services can be hosted services that are provided by servers and delivered across a network to a client platform to enhance, supplement, or replace applications executed locally on a client computer. Clients 135 can use cloud-based services to quickly receive software upgrades, applications, status updates for associated distributed systems, and other resources that would otherwise require a lengthy period of time before the resources can be delivered to the client 135.

As described in the present disclosure, on-demand services can include multiple types of services such as products, actionable analytics, enterprise portals, managed web content, composite applications, software upgrades, business objects, status messages for distributed systems, or capabilities for creating, integrating, and presenting business applications. For example, the cloud-based implementation of the present disclosure can allow clients 135 to transparently upgrade from an older client interface platform to newer releases of the platform without loss of functionality. Clients of a server application 114 can also obtain suggested configuration settings for use with server application 114 based on client context data associated with the client. Based on the client's own self configuration settings and on client context data comprising situational data associated with the client, recommendations for increasing productivity for the client can be provided to the client.

Further, clients can register in a cloud-based environment, which allows the clients to download additional features and capabilities to enhance the client's productivity on demand, rather than relying on on-premise applications provided by a client's employer, for example, to increase client productivity features. The clients can also store the client context data on a cloud-based server, which allows sharing knowledge with other clients and increasing the speed at which new client productivity features are provided. Still further, additional features and services designed to augment an existing transaction or application can be provided graphically such as in the form of a side panel. The side panel can interact with existing applications and transactions and visually represent additional on-demand services that the client can select as needed. The side panel can also act as a document management service allowing clients to add and store, via the side panel, attachments relevant to the client's current working context. Help services can also be enhanced via the side panel. For example, in addition to basic help content provided by an on-demand application, clients can also integrate existing help content from a hosted environment or any other help providing environments. Furthermore, such help information can be shared among other clients via on-demand services.

Additional on-demand services can also be implemented using the techniques described in the present disclosure. A tagging infrastructure and application interrogation API (application programming interface) can be used to augment and enhance existing applications. Applications can be interrogated to identify data objects for annotation via tags. The cloud-computing environment can then attach on-demand services to particular annotated and tagged objects such as search, mail, and financial data services. Thus, different applications and services can be coupled and augmented without changing the source code to the underlying applications. Moreover, on-demand services for automating tasks can record client interaction sequences and play the sequences back as needed so that clients do not have to repeat repetitive tasks. Personal workflows can be optimized and elements of an application can work more effectively together using on-demand services for automating tasks. In addition, collaboration and decision-making tools can be integrated into the existing customer landscape using on-demand services. Also, clients can be enabled to create portal pages containing static content in conjunction with applications. Still further, existing applications can be simplified using on-demand services so that only the elements and information needed for the current task performed by the application are shown to a client.

In the implementation illustrated in FIG. 2, the device 101 includes a processor 110 operable to execute at least one application 144, a memory 109, a network interface 108, and a graphical client interface 138. The network interface 108 is used by the device 101 for communicating with other systems, computers, or devices within or external to environment 100, such as through the device's connection to the network 132. Generally, the network interface 108 comprises logic encoded in software and/or hardware in a suitable combination and operable to communicate with the network 132. More specifically, the network interface 108 may comprise software supporting one or more communication protocols associated with communications such that the network 132 or hardware is operable to communicate physical signals within and outside of the illustrated environment 100.

FIG. 2 further illustrates an example of the external design of the device 101. As illustrated, the device 101 includes a screen 140 for displaying information and through which input is entered by, for example, a set of permanent hardware buttons 105, a set of soft keys or a software-based keyboard 107, an application window 144a displaying at least a portion of an executing application 144 (e.g., web-based application). The case may comprise any materials or structure housing the various portions of the device 101. Additionally, the case may provide a functional or ornamental bezel surrounding the screen 140 and hardware buttons 105. The hardware buttons 105 may be any buttons included with the device 101, including a power button, a volume button, a physical keyboard, a back button, a home button, or any other physical button or key used in the operation of the device 101. The application window 144a comprises at least a portion of the GUI 138 used to display visual output and/or information associated with a particular executing operation or application. It will be understood that in some implementations, multiple instances of application windows 114a associated with the same or different applications or operations may be presented simultaneously on the GUI 138. Additionally, the device 101 may allow for application windows 144a to be tiled, stacked, hidden, or otherwise moved and manipulated, for example, through specific touch and/or multi-touch gestures, as well as through manipulation of the hardware buttons 105 or software keys (or software-based keyboard) 107.

Returning to the client device 101, a set of soft keys and/or a software-based keyboard 107 may also be presented on the GUI 138. These software-based inputs allow for application- and/or operation-specific buttons and inputs to be presented in a particular application or operation context. For instance, the application 144 may display to the client 135 through application window 144a a list of remote components. The list may be a textual list arranged in a table or chart. Or the list may be a set of icons representing the remote component. In FIG. 2, the remote components are referred to as "Component" 150, and the device 101 may display each component representation 150 associated with the device 101 on the screen 140. For example, FIG. 2 shows Component 1, Component 2, and Component N, where Component N is the nth component associated with the device. The application window 144a may also display a status message 152 for each component representation listed or displayed on application window 144a. The status message 152 may be unique for each component, and may take the form of a text message, an icon, or other representation providing the client with the information sought.

The application window 144a may display soft keys associated with the application, and in the instance illustrated in FIG. 2, the application window 144a provides soft keys for updating the status message 152. For example, each status message may have its own Update soft key 142 which, when "pressed," sends a request for a status update to processor 110, which processes the request in a manner in accordance with the present disclosure. The application window may also have an Update All soft key 143 for updating all of the associated or displayed components. It is to be understood that the forgoing provide examples of possible configurations, and that other configurations are contemplated by this disclosure. For example, it is understood that a client may program a soft key to update a subset of associated and/or displayed components. It is further understood that the update requests may be initialized by hardware keys, soft keys (e.g., software keyboards), or other stimuli, including voice-activated controls.

The software keys and software-based keyboard 107 can be located in a particular position on the GUI 138, or may be moveable around the GUI 138 through touch gestures. Furthermore, some applications and software may have buttons embedded or included within the application window 144a, which can be activated through a touch gesture in the appropriate location on the screen 140. In one example, a software-based keyboard 107 may be hidden during web browsing until a text box or other text-based input is needed or requested.

In certain embodiments, the client device 101 may request a status message automatically without prompting from a client. For example, upon initialization of application 144, the system may prompt an update of the status of each of the systems 106 associated with the client (or as determined in the start-up routine of the application 144). Likewise, for each component 106, an auto-update may be scheduled at a predetermined time. Throughout this disclosure, it is to be understood that each component 106 may be updated or otherwise managed individually and/or in parallel with the other components 106. Thus, each component 106 may be updated at different times, based on different types of information, and upon different client or system stimuli.

Client 135 may request a status update for one or more components 106 using device 101. Specifically, client 135 may run application 144, displaying application window 144a, and select one or more components to receive a status update. Processor 110 processes the status update request by first determining whether status information is available and up to date in memory cache. For example, processor 110 may first look to memory cache 112b residing locally on client device 101 for available and up-to-date status information. Memory cache 112b may store status information for each remote component 106 associated with the client 135. Further, memory cache 112b may store unique status information for each component 106 and a status message 152 may be determined based on different data for each component 106. If the information is available and up to date for at least one of the components at issue, the available and up-to-date status information is returned to the application 144 and displayed to the client 135 on the client device 101. Status message retrieval from the memory cache for information associated with a component may occur whether or not information for other components is available and up to date in memory cache. In other words, if status information is available for Component 1 in memory cache 112b, but not available and up to date for Component 2, a status message is still returned to the client for Component 1, while more processing occurs with respect to the status information for Component 2. In some instances, memory cache 112a may be located remotely, in which case, processor 110 may execute instructions to send the request for a status update to server 102 (as described above in FIG. 1), which subsequently executes instructions to determine whether status information is available from memory cache 112a. As described above, the system itself may prompt and execute an update for a particular component 106 based on preset configurations, such as auto-update schedules and time-out values. The mechanism for searching and retrieving status information would be similar to the case where a request is initialized by the client, as described in this disclosure. If the information is available on the memory cache 112a or 112b, and that information is up to date, a status message 152 is generated and displayed to the user.

Status information may be considered available if it is stored in memory cache 112a or 112b. Status information for a component is up to date if it satisfies a predetermined criteria. For example, a client 135 may set an age limit for status information. If a status information stored in memory cache is more than 30 minutes old, for example, it may be considered stale and in need of refreshing. Any appropriate age limit may be set based on the preferences of the client and/or the system administrator. Further, different ages may be set for the status information for different remote components 106, and the system can work in parallel to retrieve and refresh status information for each component 106. Memory cache 112a and 112b may have a relatively small capacity, in which case older status information may be deleted automatically at a predetermined time set by the client, the administrator, or based on a queued system, such as a first-in, first-out (FIFO). The use of memory cache for storing status information is to provide a storage repository for rapid collection of status information. Status information is considered non-compliant if the data is either unavailable or out-of-date.

If memory cache 112a or 112b does not have status information or if the status information stored thereon is not up to date, the processor 110 or 111 may initiate a search of one or more prefetch tables 116a or 116b. Prefetch tables 116a, for example, stored on a memory on server 102, may store up-to-date status information for one or more components 106. Since prefetch tables 116a are located at server 102, they may store up-to-date information based on, for example, other clients' requests for updated information of the same component. For that reason, the prefetch table may be searched for available and up-to-date status information for the one or more remote components. The prefetch tables 116b may be stored locally in cases where speed is critical and/or memory cache size is very small.

Local storage of the prefetch tables 116b offers the advantage of faster retrieval but may result in less up-to-date information compared to remotely stored prefetch tables 116a due to other clients in the distributed system. For example, a different client may request a status update of Component 2 150 from FIG. 2. That information may not be available or up to date on either memory cache 112a or prefetch tables 116a. In that case, the information is retrieved by server 102 from the remote components 106 across network 132. For example, data gathering module 120 may request and/or retrieve the data from remote component 106 and then store that updated information into memory cache 112a or 112b and, in certain instances, in prefetch tables 116a. If the prefetch tables 116a are updated, that information becomes available to client 135, and that information may be more current that the information stored in its local memory cache 112b or its prefetch tables 116b. The local, less up-to-date information may be sufficient for the components 106 and/or client 135 based on the configuration preferred. For example, if the information stored on memory cache 112b has not reached its age expiration, that information may still be used to generate a status message 152 for that component, even if newer information is available on a remotely stored prefetch table 116a.

Prefetch tables 116a may be updated by third-party client requests for status information of the components in an associated distributed landscape. The memory cache 112a or 112b may be updated with the data stored on the prefetch tables 116a after a third-party updating. For example, the system may automatically update the memory caches 112a and 112b with the new information in the prefetch tables. In certain embodiments, the configuration information received by the client 135 indicates that the information stored on the memory caches 112a and 112b is to be considered up to date, even though it is technically older than what is stored on the corresponding prefetch table for that particular remote component. In such a case, the memory cache is not updated. The data in memory caches 112a and 112b, in such an instance, would be considered up to date, and replacing it with the newer data from the prefetch would be undesirable and inefficient. In other embodiments, an update in a prefetch table 116a corresponding to a distributed component associated with the client 135 may trigger an alert that new information is available, and the client may request that memory caches 112a and 112b be updated with the status information on the prefetch tables 116a.

Returning to the block diagram of the environment 100 in FIG. 1, the network 132 can allow the client device 101 to communicate with the server 132 and at least a portion of the functionality provided by the server 102. Further, network 102 can allow the client device 101 to communicate with server 102. At a high level, the server 102 comprises an electronic computing device operable to receive, transmit, process, store, or manage data and information associated with the environment 100. In general, server 102 may be any computer or processing device such as, for example, a blade server, general-purpose personal computer (PC), Macintosh, workstation, Unix-based computer, or any other suitable device. In other words, the present disclosure contemplates computers other than general purpose computers, as well as computers without conventional operating systems. Server 102 may be adapted to execute any operating system including Linux, UNIX, Windows Server, or any other suitable operating system. In some instances, such as that illustrated in FIG. 1, the server 102 hosts or executes a web-based application which can then be viewed or interacted with at the device 101 via the touch device's GUI 138. Input and interactions at the device 101 can be interpreted and relayed to the web-based application in accordance with the host applications' 114 functionality and processing.

Figure 3:
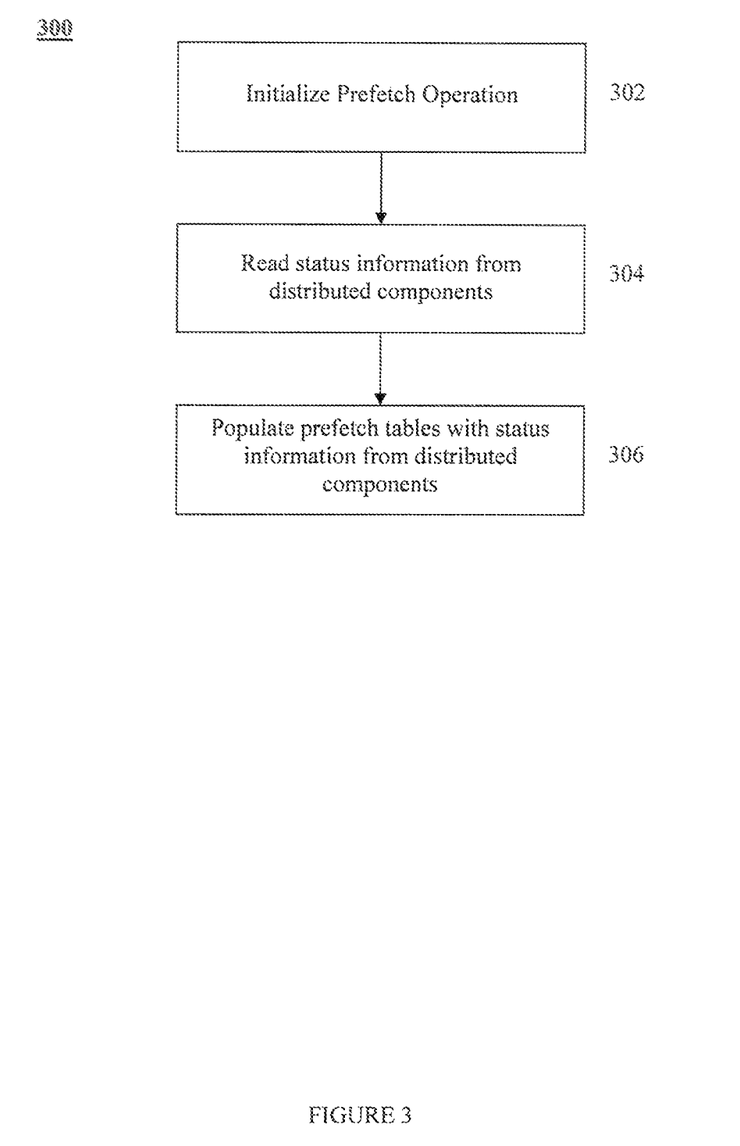
FIG. 3 is a process flow diagram for performing a data prefetch from a remote component and storing that data in a prefetch table in accordance with the present disclosure.

FIG. 3 is a process flow diagram 300 for performing a data prefetch from a remote component and storing that data in a prefetch table in accordance with the present disclosure. Upon initialization of a connection to a remote component, a status prefetch job is started (302). Data is read from distributed components (304). In certain instances, the data is read by a data gathering module. The data is stored in a prefetch table (306). In embodiments, the data is stored in prefetch tables associated with the remote component. If a prefetch table has yet to be instantiated for a component or if additional tables are needed, the system may perform steps necessary to establish the tables. Initialization may include connecting to an established remote component or reinitializing an existing connection, or may include other connection establishments as needed to acquire information from a remote component and populate a prefetch table. Prefetch tables may be populated or updated at predetermined intervals. The data read at (304) may be performed at different times for the different components and their associated prefetch tables. For example, a first prefetch table associated with a first component may be updated every two hours, whereas, a second prefetch table associated with a second component may be updated every four hours. Update schedules may be static. For example, update schedules may be based on network speeds, connection types, or the number of clients associated with the component(s). The update schedules may also be dynamic and/or alterable. For example, the prefetch table update may be changed based on client or administrator configuration settings. The prefetch table update may also be changed based on statistical information received and processed over several update cycles. For example, if a particular prefetch table has an automatic update every four hours, but clients request updates at a higher periodicity (or a lower periodicity), the system may use the statistical data received to change the update schedule for that component to be more in line with client request patterns.

Figure 4:
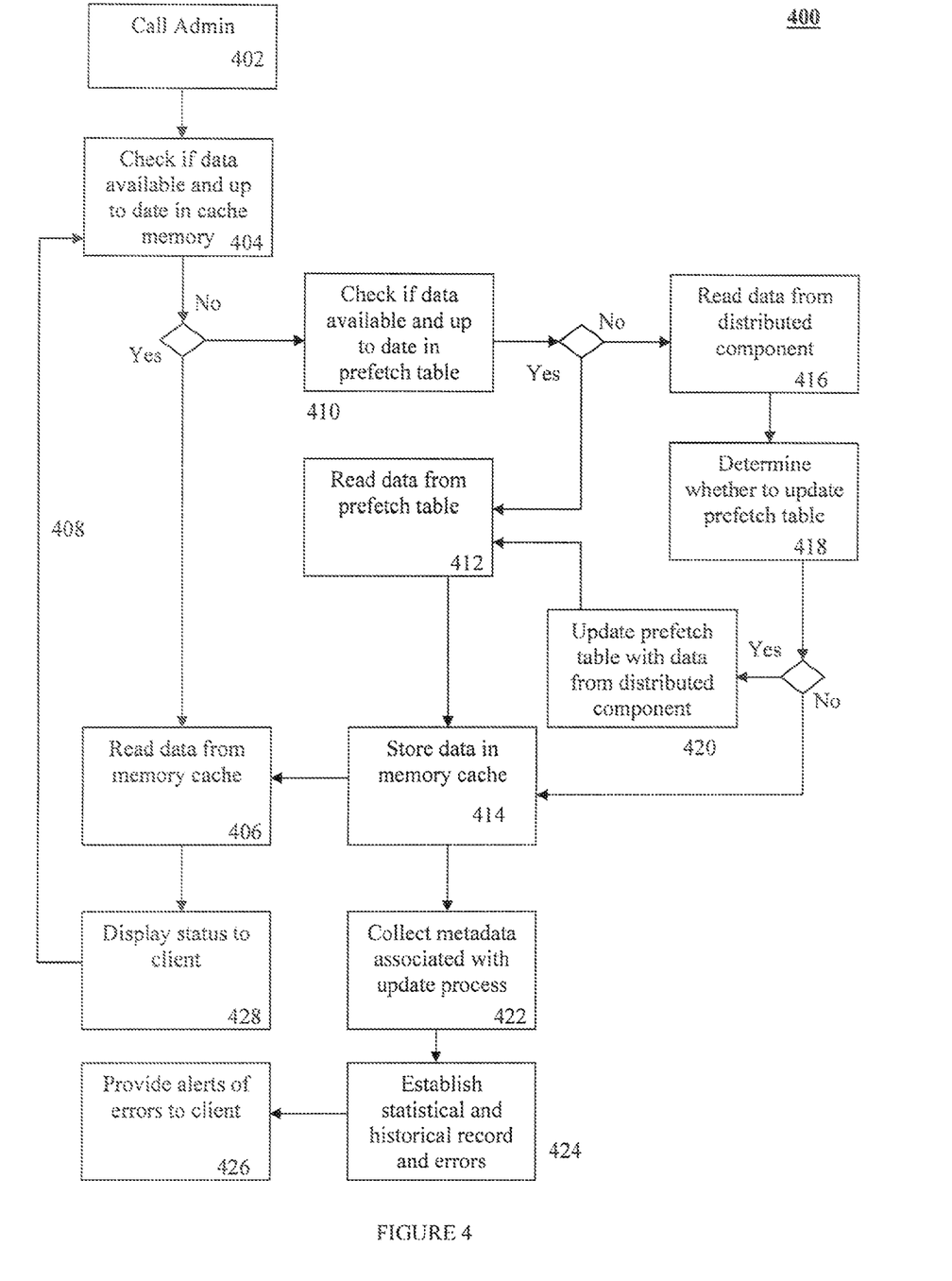
FIG. 4 is a process flow diagram for providing up-to-date status information of distributed systems to a client in accordance with the present disclosure.

FIG. 4 is a process flow diagram 400 for providing up-to-date status information of distributed systems to a client. At a high level, the system uses a multilevel architecture to provide up-to-date status information associated with components in a distributed landscape to a client. Prefetch jobs, whose recurrence is configurable and whose execution may be independent from a client request, may be one way to update the status information. Prefetch jobs may update all entries in the prefetch tables or may update some, depending on the configuration of the system. In some embodiments, a status update is triggered by a client request, when a client requests to view, update, or otherwise process the data or another software component wants to read it, and the data has not yet been fetched or is too old. The memory cache is first checked to determine whether the data is already in memory. If it is, then the information is returned immediately and is available for display or further processing. If the information is not available from memory cache, the system reads the data from the prefetch table and puts it into the memory such that is also quickly available for further requests. If the data is not yet in the prefetch table (since the prefetch jobs have not yet run), the system reads the data directly from the remote components and stores it again into the memory and the prefetch table. The latter can be omitted to avoid concurrent writes to the database.

In each case, the consumer of the data gets a result, whose age depends on the time, where the corresponding prefetch job was executed. If the consumer is not satisfied with the age of the data, it can trigger another request for the current data, which is then directly forwarded to the respective components (for example, where the data is not yet in the prefetch table) and memory and the prefetch table is updated (in some instances). This updated information is then also available for all other consumers.

Upon a request for a status update for one or more components of a distributed landscape, an administrator, such as a central landscape administrator, may be called (402). The central landscape administrator may be run on a server and viewed on an application local to the client. A memory cache is provided that can store status information for one or more of the components. The term "provided" in this context is meant to suggest that the memory cache is made available to be accessed by a client and/or by a server, and may be local to the client or it may be remote from the client and at a server. The memory cache is checked to determine whether information associated with the status of a component in the networked landscape is available and up to date (404). The terms "updated" and "up to date" regarding the status information may refer to configurable parameters defined by the client or the administrator or other entity. Status information may be up to date if the status information satisfies a predetermined or predefined requirement. In some instances, status information stored in the memory cache (and/or the prefetch tables) may be up to date even if the status of the remote component has changed since the last update cycle, as long as the status information stored in memory satisfies the configuration of the system. For example, a client may configure the system to recognize that data is up to date, and therefore acceptable for display, if it is two hours old. Therefore, status information that is two hours old may be provided to the client from memory even if the actual status of the remote component has changed. If the data is available and up to date, the data is read from the memory cache (406) and displayed to the client (428). These operations may be carried out in series or in parallel with similar operations for other remote components, until all desired status messages have been displayed. In embodiments, the status message is displayed to the client using an application window local to the client, but may be a web-based application or a remote application providing a virtual network application window to the client. If the data is unavailable on the memory cache or the data stored on the memory cache is not up to date, a prefetch table associated with the component in the networked landscape is checked (410). The prefetch table associated with the remote component may be predetermined or the appropriate prefetch table may need to be determined based on configuration information associated with the remote component and/or the user. Several periodic jobs (prefetch jobs) are used to get the landscape information from the central landscape directory (to be able to determine dynamically the available components and their connection parameters), as well as the different sets of status information from the remote, distributed components. These jobs are independent from each other (hence, they can run in parallel), as well as independent from the rest of the mechanism. The data fetched by these jobs may be stored into a central database table (prefetch table) together with the current time (this information is later used to determine the age of the entries).

Each read to the memory checks the age of the data against a configurable maximum age. If the data is older than that, the data in the prefetch table is checked. If the data is available and up to date from the prefetch table, the data is read from the prefetch table (412). In embodiments, the data from the prefetch table is stored on the memory cache for future use (414). The status message is then generated and displayed to the user (428). In certain embodiments, the status information is read from the prefetch tables and stored on the memory cache, and the status information is read from the memory cache and displayed to the user. In other embodiments, the data read from the prefetch tables may be streamed to the client and displayed without storing and reading the data from the memory cache. This permits the memory cache to maintain up-to-date information stored therein without having to give up memory capacity. Such settings may be user controlled or predetermined in the architecture. If the data is not stored on the prefetch table or the data stored in the prefetch table is not up to date, the data may be read from the remote component (416). The data may be read directly from the remote component across the network. In certain embodiments, the data may be read by a processor on an intermediate server implementing an administrator application and transmitted across the network to the client. In certain instances of the embodiments, a determination is made whether the data read from the remote component should be stored on the corresponding prefetch table associated with that remote component (418). If the determination is made that the data should be stored in the prefetch tables, then the operation of storing the data on the corresponding prefetch table associated with the remote component is carried out (420), and the data may be read from the prefetch table by the processor on the client device or on the server (412). The data is then stored into the memory cache for future use (414). In certain instances, no determination is made, and the data is stored on the prefetch tables automatically. Alternatively, the prefetch table update is bypassed entirely. In this instance, and in the instance where the determination results in bypassing the prefetch table, the data read from the remote component is stored into memory cache without first storing the information into a prefetch table. In other instances, the data is streamed from the prefetch tables and displayed to the client.

The prefetch tables may be an intermediate layer between the client device and the remote components. The prefetch tables may be updated with status information from the remote components in a background thread, and at regularly scheduled intervals. In certain instances, the prefetch tables may return information to the client that is old information and does not request an update from the remote component. The system may dynamically determine whether the costs to the system of updating the prefetch tables in response to a status update request is worth providing accurate data to the client. The system may measure the inaccuracy against the costs to system performance, including access times and bandwidth. Returning to the example above where the system has been configured to define updated data as no older than two hours old—if the data in the prefetch table is two hours and one minute old, the system may determine that the data inaccuracy is not worth burdening the system by performing an update of the prefetch tables with information from the remote components. The system may return the two hour and one minute old information to the client.

In other circumstances, the system may perform the update to the prefetch table even though the data inaccuracy is low. For example, if the client is requesting status information of a component at a high frequency relative to the regularly scheduled prefetch table update, then the inaccuracy of the status information provided to the client from the prefetch tables increases. The system may determine that the frequency of the requests for status updates from the client may warrant an updating of the prefetch table from the remote component to reduce the data inaccuracy that would persist until the prefetch table were automatically updated at its scheduled interval. The update would occur at the time the status information becomes older than the predetermined age threshold. This dynamic determination would permit the system to balance the frequent requests for updated information with system performance.

In other instances, if client requests are not close in time (e.g., within the interval of one remote system call duration) then prefetch tables may be updated with status information from the remote component because infrequent client requests could be satisfied without compromising system performance. To summarize, the prefetch tables may be updated in a background thread and at regularly scheduled intervals. The system may dynamically determine whether to provide real-time updates to the prefetch tables from the remote components based on a measure of data inaccuracy and system performance considerations.

In certain instances, errors in the process flow may be monitored and recorded (422). In addition, historical data may be recorded and stored in a memory. The errors and historical data, including metadata, may be used to generate a statistical model for the update process (424). The historical data and the error data may be used to create alerts presented to the user to let the user know of issues with the landscape and the status updating process (426). The historical data may also be used in a semantic architecture. In such an architecture, the process flow may be streamlined based on positive and negative information learned by the system during the updating process. For example, the location of particular information may be recorded and used to speed the process. Further, statistical data of client and third party access to prefetch tables may be collected to determine probabilities of the locations of updated status information. For example, persistent access of prefetch tables may be an indication of fast time-out values associated with the status information associated with a particular remote component and stored in memory cache. Other implementations and advantages of statistical information will be apparent from this disclosure and from the claims.

A number of embodiments and instances have been described and are meant to be illustrative. It will be understood that other embodiments and manifestations of the above methods, systems, and articles are contemplated by this disclosure, including from the above description, the drawings, and the claims.

What is claimed is:

1. A method for providing a status message to a client for a component in a distributed computing landscape, the method comprising:

identifying a memory cache, the memory cache configured to store status information for the component in the distributed computing landscape;

identifying one or more prefetch tables, the one or more prefetch tables configured to store status information for the component in the distributed computing landscape;

determining that the status information is unavailable from the memory cache;

based on a determination that the status information is unavailable from the memory cache, obtaining the status information from the one or more prefetch tables;

identifying an accuracy of the status information obtained from the one or more prefetch tables;
based on a determination that the accuracy of the status information is less than a threshold, obtaining the status information from the component;
identifying a system performance cost to update the one or more prefetch tables with the status information obtained from the component;
based on the identified system performance cost, determining whether to update the one or more prefetch tables with the status information obtained from the component;
based on a determination to update the one or more prefetch tables, updating the one or more prefetch with the status information obtained from the component;
based on a determination to bypass updating the one or more prefetch tables, updating the memory cache with the status information obtained from the component; and
displaying the status message for the component to the client, the status message based on the obtained status information.

2. The method of claim 1, wherein based on the determination to update the one or more prefetch tables, further updating the memory cache with the status information stored in the one or more prefetch tables.

3. The method of claim 1, wherein the status information stored in the memory cache is different from the status information stored in the one or more prefetch tables.

4. The method of claim 3, wherein the status information stored in the memory cache has a different age than the status information stored in the one or more prefetch tables.

5. The method of claim 1, wherein the status information is unavailable from the memory cache when the status information exceeds a predetermined age.

6. The method of claim 5, wherein displaying the status message to the client further comprises:
generating the status message based on information received from the component.

7. The method of claim 6, wherein the status information is unavailable from the one or more prefetch tables when the status information exceeds a predetermined age.

8. The method of claim 1, wherein based on the determination to update the one or more prefetch tables:
reading the status information from the one or more prefetch tables; and
storing the status information read from the one or more prefetch tables in the memory cache.

9. The method of claim 1, wherein the memory cache stores first status information for the component, and the one or more prefetch tables store second status information for the component.

10. The method of claim 9, wherein the first status information and the second status information have the same properties.

11. The method of claim 9, wherein the first status information has a first time-out value, and the second status information has a second time-out value.

12. The method of claim 11, wherein the first time-out value is less than the second time-out value.

13. The method of claim 1, wherein the memory cache is automatically updated based on the status information stored in the one or more prefetch tables, the one or more prefetch tables corresponding to the component.

14. The method of claim 1, wherein the component is a first component, the memory cache further configured to store the status information for a second component in the distributed computing landscape, the one or more prefetch tables further configured to store the status information for the second component, and the second component accessible to provide status information associated with the second component.

15. The method of claim 14, wherein the status information associated with the first component is updated independent of the status information associated with the second component.

16. The method of claim 1, further comprising:
receiving a request from the client to receive the status information for the component in the distributed computing landscape.

17. The method of claim 16, wherein the component is a first component, the method further comprising:
receiving a first request from the client to receive the status information of the first component;
receiving a second request from the client to receive status information of a second component; and
processing the first request independent of the second request.

18. The method of claim 1, further comprising:
storing metadata associated with the status information displayed to the client upon execution of a status update process for the component;
processing the metadata; and
establishing statistical data associated with the update process for the component.

19. The method of claim 18, wherein the statistical data includes errors associated with the update process, and the method further comprises alerting the client to errors found by the statistical data.

20. The method of claim 18, further comprising using the statistical data to enhance the efficiency of the update process.

21. The method of claim 1, further comprising:
reading the status information from the one or more prefetch tables;
streaming the status information to the client; and
displaying the status information to the client.

22. The method of claim 1, wherein at least one of the memory cache and the one or more prefetch tables are located in a cloud-based computing network.

23. A system for providing to a client status updates of one or more components of a distributed computing landscape, the system comprising:
a memory device storing a memory cache, the memory cache configured to store status information for the component in the distributed computing landscape;
a memory device storing one or more prefetch tables, the one or more prefetch tables stored on a repository, and configured to store status information for the component in the distributed computing landscape;
a server comprising one or more hardware processors, the server in communication with the client and the one or more components of the distributed computing landscape, the one or more components of the distributed computing landscape accessible by the server, the server operable to:
determine that the status information is unavailable from the memory cache;
based on a determination that the status information is unavailable from the memory cache;
obtain the status information from the one or more prefetch tables;
identify an accuracy of the status information obtained from the one or more prefetch tables;
based on a determination that the accuracy of the status information is less than a threshold, obtain the status information from the component;

identify a system performance cost to update the one or more prefetch tables with the status information obtained from the component;

based on the identified system performance cost, determine whether to update the one or more prefetch tables with the status information obtained from the component;

based on a determination to update the one or more prefetch tables, update the one or more prefetch with the status information obtained from the component;

based on a determination to bypass updating the one or more prefetch tables, update the memory cache with the status information obtained from the component; and provide the obtained status information to the client.

24. The system of claim 23, wherein the server is operable to provide the status information to the client based on receiving a request for the status information.

25. The system of claim 23, wherein the server is operable to store the status information in the memory cache and the one or more prefetch tables based on predetermined configuration information.

26. The system of claim 23, wherein the memory cache is located local to the client.

27. The system of claim 23, wherein at least one of the one or more prefetch tables is located local to the client.

28. The system of claim 23, wherein the distributed computing landscape includes a cloud-based computing network, the cloud-based computing network including the server, and wherein the client is in communication with the cloud-based computing network to receive the status information from the cloud-based computing network of the one or more components of the distributed computing landscape.

29. The system of claim 28, wherein the cloud-based computing network includes at least one of the memory cache and the one or more prefetch tables.

30. An article comprising software for providing to a client status updates for a component in a distributed computing environment, the software including instructions stored on a non-transitory and tangible computer readable medium and operable when executed by a processor to perform the following operations:

determining that status information is unavailable from a memory cache, the status information associated with the component in the distributed computing environment;

based on a determination that the status information is unavailable from the memory cache obtaining the status information from the one or more prefetch tables;

identifying an accuracy of the status information obtained from the one or more prefetch tables;

based on a determination that the accuracy of the status information is less than a threshold, obtaining the status information from the component;

identifying a system performance cost to update the one or more prefetch tables with the status information obtained from the component;

based on the identified system performance cost, determining whether to update the one or more prefetch tables with the status information obtained from the component;

based on a determination to update the one or more prefetch tables, updating the one or more prefetch with the status information obtained from the component; and based on a determination to bypass updating the one or more prefetch tables, updating the memory cache with the status information obtained from the component.

* * * * *